United States Patent [19]
Tanaka et al.

[11] Patent Number: 5,661,206
[45] Date of Patent: Aug. 26, 1997

[54] FLUIDITY CONTROL OF CEMENTITIOUS COMPOSITIONS

[75] Inventors: Yoshio Tanaka, Komae; Akira Ohta, Chigasaki; Hideyuki Tahara, Osaka; Tsuyoshi Hirata, Yokohama, all of Japan

[73] Assignees: MBT Holding AG, Zurich, Switzerland; Nippon Shokubai Co., Ltd., Osaka, Japan

[21] Appl. No.: 579,041

[22] Filed: Dec. 21, 1995

Related U.S. Application Data

[63] Continuation of Ser. No. 258,143, Jun. 10, 1994, abandoned.

[30] Foreign Application Priority Data

Jun. 11, 1993 [JP] Japan .................... 5-140986

[51] Int. Cl.$^6$ .................... C08J 3/215; C08K 5/06; C08L 33/00
[52] U.S. Cl. .................... 524/378; 524/5; 524/377; 524/376; 524/558; 524/556
[58] Field of Search .................... 524/5, 558, 833, 524/378, 317, 156, 145, 107, 243, 556

[56] References Cited

U.S. PATENT DOCUMENTS

| | | | |
|---|---|---|---|
| 4,029,585 | 6/1977 | Dettre et al. | 252/8.6 |
| 4,442,258 | 4/1984 | Sunakawa et al. | 524/767 |
| 4,792,360 | 12/1988 | Pierce et al. | 106/90 |
| 4,808,641 | 2/1989 | Yagi et al. | 524/5 |
| 4,997,857 | 3/1991 | Timberlake et al. | 521/116 |
| 5,145,727 | 9/1992 | Potts et al. | 428/198 |
| 5,149,576 | 9/1992 | Potts et al. | 428/198 |
| 5,169,894 | 12/1992 | Holland et al. | 524/502 |
| 5,178,931 | 1/1993 | Perkins et al. | 428/198 |
| 5,178,932 | 1/1993 | Perkins et al. | 428/198 |
| 5,319,020 | 6/1994 | Rosenski et al. | 524/762 |
| 5,362,323 | 11/1994 | Koyata et al. | 106/810 |

FOREIGN PATENT DOCUMENTS

| | | |
|---|---|---|
| 0271435 | 6/1988 | European Pat. Off. . |
| 0 448 717 | 10/1991 | European Pat. Off. . |
| 0 612 702 | 8/1994 | European Pat. Off. . |
| 2 668 773 | 5/1992 | France . |
| 3041160 | 2/1991 | Japan . |
| 5148454 | 6/1993 | Japan . |
| 1595482 | 8/1981 | United Kingdom . |
| 2160879 | 1/1986 | United Kingdom . |
| WO 92/18569 | 10/1992 | WIPO .................... C08L 23/06 |
| WO 95/01396 | 1/1995 | WIPO .................... C08L 23/04 |

OTHER PUBLICATIONS

Chemical Abstract No. 106:218689k, "Additives for slump loss prevention of cement mortar and concrete", Tsubakimoto, T., et al., vol. 106, No. 26 (Mar. 1987).

Chemical Abstract No. 103:146301r, "Cement compositions having fluidity", Nippon Zeon Co., Ltd., vol. 103, No. 18 (Apr. 1985).

Patent Abstracts of Japan vol. 15, No. 238, JP 3075252: "Cement Admixture", Nippon Shokubai Kagaku Kogyo Co. Ltd., (Jun. 1991).

*Primary Examiner*—Paul R. Michl
*Assistant Examiner*—U. K. Rajguru
*Attorney, Agent, or Firm*—Carol A. Loeschorn; Andrew N. Parfomak

[57] ABSTRACT

An admixture for modifying the fluidity of a cementitious mixture comprises a cement-dispersing agent which is an aqueous solution of polymer, in which solution an oxyalkylene-based defoaming agent is dissolved or dispersed in particles of no greater that 20 μM diameter. The polymer is preferably a polymer which comprises units derived from unsaturated carboxylic acid monomer and the polymer is preferably prepared in the presence of the defoaming agent. Particular addition copolymers give particularly good results. The admixture permits good control of the fluidity of cementitious compositions and has extended shelf life.

17 Claims, No Drawings

FLUIDITY CONTROL OF CEMENTITIOUS COMPOSITIONS

This is a continuation of application Ser. No. 08/258,143, filed Jun. 10, 1994 now abandoned.

This invention relates to fluidity control of cementitious compositions, to admixtures for achieving such control and to cementitious compositions comprising such admixtures.

Water-reducing compositions are widely used in cementitious compositions such as concrete to reduce the water content (and thereby increase strength) while maintaining fluidity or "slump" (so that the composition can flow easily, for example, around complicated formwork). Typical water-reducing agents are the so-called "superplasticisers", for example, β-naphthalene sulphonate-formaldehyde ("BNS") condensates and various polycarboxylate-based materials. One of the problems which water-reducing agents, especially the aforementioned polycarboxylates, can introduce is the entrainment into the cementitious composition of excessive volumes of air. While the presence of some air is harmless and even beneficial, excessive air entrainment leads to reduced strength. Air entrainment can of course be reduced by reducing the concentration of water-reducing agent used, but the desired slump control is then diminished. It has been proposed to use known defoaming agents to counteract excessive aeration, but this has also often proved unsatisfactory, one reason being that a mixture of water-reducing agent and defoaming agent, a commercially desirable package, is usually unstable.

It has now been found that it is possible to make an admixture which confers high slump on cementitious compositions, but without excessive aeration. There is therefore provided, according to the present invention, a fluidity-controlling admixture for cementitious compositions, comprising at least one cement-dispersing agent and at least one defoaming agent, characterised in that (a) the cement-dispersing agent is an aqueous solution of polymer; and (b) the defoaming agent is oxyalkylene-based and is either dissolved in the polymer solution or is stably dispersed therein in particles of no more than 20 μM diameter.

When the defoaming agent is soluble in the aqueous polymer solution, the admixture according to the invention is prepared simply by dissolving the defoaming agent in the solution. When the defoaming agent is not soluble in the solution, it is dispersed such that the disperse particles are no greater than 20 μM in diameter. It is to be understood here that the use of the word "particle" encompasses not only solid particulate matter (in which case the diameter referred to is the largest dimension of the particle) but also droplets of dispersed liquid, whether of inherently liquid matter or of dissolved solid material.

The particles are stably dispersed in the solution. By "stably dispersed" is meant that when prepared and allowed to stand, a dispersion will remain a dispersion for at least 24 hours. The reason for this is not fully understood, but it is noticeable that a dispersion which does not comply with this requirement does not give such good results in a cementitious composition, even when it is used when it is still a dispersion, for example, immediately upon preparation or shortly thereafter.

Dispersion of an insoluble defoaming agent is achievable in two ways. The first way is simple dispersion of the defoaming agent in the solution so that a dispersion of the appropriate particle size is given. The second way is the dispersion of the defoaming agent in the presence of polymerisable monomer and polymerisation of the monomer to give the polymer. It has been found that dispersions prepared in this second manner give especially good results and are preferred. A further practical advantage is that the achievement of the desired small particle size is more easily achievable. Details of preferred monomer compositions are given hereinunder.

The polymer for use in this invention may be any polymer which is water-soluble and which is a water-reducing agent or a cement-dispersing agent. However, it has been found that certain polymers give especially good results. Thus, in a preferred admixture, the polymer comprises a main component which is selected from at least one of (A) a copolymer obtained by polymerising a monomer mixture which comprises an unsaturated carboxylic acid monomer;

(B) the neutralised salt of (A); and (C) the polymer obtained by crosslinking (A) and/or (B) by means of a crosslinking agent.

In a preferred embodiment, the monomer mixture comprises (1) from 5–98% by weight of an alkylene glycol mono (meth)acrylic acid ester monomer (a), of the formula I

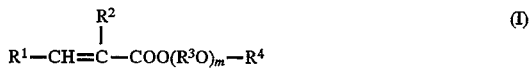

wherein $R^1$ and $R^2$ are independently hydrogen or methyl, $R^3$ is an alkylene group of from 2–4 carbon atoms, $R^4$ is hydrogen or an alkyl group of 1 to 22 carbon atoms, and m represents an integer of 1 to 100, and (2) from 2 to 95% by weight of a (meth)acrylic acid based monomer (b), of the formula (II)

wherein $R^1$ and $R^2$ have the above mentioned significances, and $M^1$ is hydrogen, monovalent metal, divalent metal, an ammonium group or an organic amine group, and (3) from 0 to 50% by weight of a monomer (c), capable of being copolymerized with these monomers provided that the sum of (a), (b) and (c) shall be 100% by weight.

In a further embodiment of the invention, said monomer mixture comprises from 5–98% by weight of an (alkoxy) polyalkylene glycol mono(meth)allyl ether based monomer (d) of the formula (III);

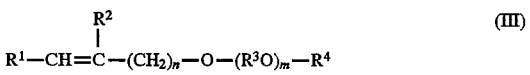

wherein $R^1$, $R^2$, $R^3$, $R^4$ and m are as hereinabove defined and n is 0 or 1, and 2 to 95% by weight of an ethylenically unsaturated carboxylic acid based monomer (e) of the formula (IV)

wherein X and Y are independently selected from hydrogen, methyl and —COOM$^3$, or X or Y together with —COOM$^2$ form an anhydride ring, Z is selected from —CH$_2$COOM$^3$, hydrogen or methyl and $M^2$ and $M^3$ are independently selected from the significances of $M^1$ given hereinabove, an alkyl group of 1–20 carbon atoms, an alkylene glycol of 2–4 carbon atoms and a polyalkylene glycol of from 2–100 mols of a glycol adduct, provided that at least one of $M^2$, $M^3$ is selected from hydrogen, monovalent metal, divalent metal, ammonium group and an organic amine group; and from 0–50% by weight of monomer (f) capable of copolymerisation with (d) and (e), (d)+(e)+(f) being 100% by weight.

In a further preferred embodiment, said monomer mixture comprises from 5–98% by weight of at least one α-olefinic monomer (g) having from 2–12 carbon atoms, from 2–95% by weight of an ethylenically unsaturated dicarboxylic acid anhydride based monomer (h) and from 0–50% by weight of monomer (i) copolymerisable with (g) and (h), (g)+(h)+(i) being 100% by weight.

Polycarboxylic acid based is a general name of a cement-dispersing agent which contains as a main component a copolymer (A) obtained by polymerising a monomer mixture containing an unsaturated carboxylic acid based monomer as an essential component and/or a copolymer (B) obtained by further neutralizing the copolymer (A) with an alkaline substance and/or a cross-linked copolymer (C) obtained by post cross-linking the copolymer (A) by using a cross-linking agent. The unsaturated carboxylic acid monomer may include unsaturated monocarboxylic acid such as (meth)acrylic acid and monovalent metal salt, divalent metal salt, ammonium salt and an organic amine salt thereof; an unsaturated di-carboxylic acid such as maleic acid, fumaric acid, citraconic acid, itaconic acid, etc. and monovalent metal salt, divalent metal salt, ammonium salt, an organic amine salt, anhydride thereof or a monoester of these acids with an aliphatic alcohol having 1 to 20 carbon atoms or a glycol having 2 to 4 carbon atoms or a polyalkylene glycol having 2 to 100 addition mol number. One or more of these can be used.

Further preferable monomer mixtures comprise a mixture containing 5 to 98%, preferably 50 to 97%, by weight of an alkylene glycol mono(meth)acrylic acid ester monomer designated by the abovementioned general formula (I), 2 to 95% by weight, preferably 3 to 50% by weight of a (meth)acrylic acid based monomer (b) designated by the abovementioned formula (II) and 0 to 50% by weight, preferably 0 to 30% by weight of monomer (c) capable of being copolymerized with these monomers, provided that the sum of (a), (b) and (c) is 100% by weight; a mixture containing 5 to 98% by weight, preferably 50 to 97% by weight of an (alkoxy)polyalkylene glycol mono(meth)allyl ether based monomer (d) designated by the abovementioned general formula (III), 2 to 95% by weight, preferably 3 to 50% by weight of an ethylenically unsaturated carboxylic acid based monomer (e) designated by the above mentioned general formula (IV), and 0 to 50% by weight, preferably 0 to 30% by weight of monomer (f) capable of being copolymerized with these monomers, provided that the sum of (d), (e), and (f) is 100% by weight; and a mixture of 5 to 98% by weight, preferably 10 to 70% by weight of an α-olefinic monomer (g) having 2 to 12 carbon atoms, 2 to 95% by weight, preferably 30 to 90% by weight of an ethylenically unsaturated dicarboxylic acid anhydride based monomer (h), and 0 to 50% by weight, preferably 0 to 30% by weight of monomer (i) capable of being copolymerized with these monomers, provided that the sum of (g), (h) and (i) is 100% by by weight.

Examples of monomer (a) include hydroxyethyl (meth)acrylate, hydroxypropyl (meth)acrylate, polyethylene glycol mono(meth)acrylate, polypropylene glycol mono(meth)acrylate, polybutylene glycol mono(meth)acrylate, polyethylene glycol polypropylene glycol mono(meth)acrylate, polyethylene glycol polybutylene glycol mono(meth) acrylate, polypropylene glycol polybutylene glycol mono (meth)acrylate, polyethylene glycol polypropylene glycol polybutylene glycol mono(meth)acrylate, methoxy polyethylene glycol mono(meth)acrylate, methoxy polypropylene glycol mono(meth)acrylate, methoxy polybutylene glycol mono(meth)acrylate, methoxy polybutylene glycol mono (meth)-acrylate, methoxy polyethylene glycol polypropylene glycol mono(meth)acrylate, methoxy polyethylene glycol polybutylene glycol mono(meth)acrylate, methoxy polypropylene glycol polybutylene glycol mono(meth)acrylate, methoxy propyethylene glycol polypropylene glycol polybutylene glycol mono(meth)acrylate, ethoxypolyethylene glycol mono(meth)acrylate, ethoxypolypropylene glycol mono-(meth)acrylate, ethoxypolybutylene glycol mono(meth) acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth) acrylate and ethoxypolyethylene glycol polypropylene glycol polybutylene glycol mono(meth)acrylate. More than one such monomer may be used.

Suitable examples of monomer (b) include acrylic and methacrylic acids and their monovalent metal salts, divalent metal salts, ammonium salts and organic amine salts. More than one such monomer may be used.

The monomer (c) is a monomer capable of copolymerization with the monomers (a) and (b). Examples of monomer (c) include esters of aliphatic alcohols of 1 to 20 carbons with (meth)acrylic acid; unsaturated dicarboxylic acids of maleic acid, fumaric acid, citraconic acid, etc., or monoesters or diesters of these acids with aliphatic alcohols of 1 to 20 carbons or glycols of 2 to 4 carbons, or polyalkylene glycols of added mol number 2 to 100 of these glycols; unsaturated amides such as (meth)acrylamide and (meth)acryl alkylamide; vinylesters such as vinyl acetate and vinyl propionate; aromatic vinyls such as styrene; unsaturated sulfonates such as vinyl sulfonates, (meth) allylsulfonic add, sulfoethyl(meth)acrylate, 2-(meth)-acrylamido-2-methylpropane sulfonic acid and styrene sulfonate, and their monovalent metal salts, divalent metal salts, ammonium salts and organic amine salts. More than one such monomer may be used.

Examples of the monomer (d) include alkoxypolylkylene glycol mono(meth)allyl ether, e.g., polyethylene glycol mono(meth)allyl ether, polypropylene glycol mono(meth) allyl ether, polyethylene glycol polypropylene glycol mono (meth)allyl ether, polyethylene glycol polybutylene glycol mono(meth)allyl ether, polypropylene glycol polybuthylene glycol mono(meth)allyl ether, polyethylene glycol polypropylene glycol polybutylene glycol mono(meth)allyl ether, methoxypolyethylene glycol mono(meth)allyl ether, methoxypolypropylene glycol mono(meth)allyl ether, methoxypolybutylene glycol mono(meth)allyl ether, methoxypolyethylene glycol polypropylene glycol mono(meth)allyl ether, methoxypolyethylene glycol polybutylene glycol mono(meth)allyl ether, methoxypolyethylene glycol polypropylene glycol polybutylene glycol mono(meth)allyl ether, ethoxypolyethylene glycol mono(meth)allyl ether, ethoxypolypropylene glycol mono(meth)allyl ether, ethoxypolybutylene glycol mono(meth)allyl ether, ethoxypolybutylene glycol mono(meth)allyl ether, ethoxypolyethylene glycol polypropylene glycol mono(meth)allyl ether, ethoxypolyethylene glycol polybutylene glycol mono(meth)ally ether, ethoxypolypropylene glycol polybutylene glycol mono(meth)allyl ether, and ethoxypolyethylene glycol polypropylene glycol polybutylene glycol mono(meth)allyl ether, and an alkoxypolyalkylene glycol monocrotyl ether, polyethylene glycol monocrotyl ether, polyethylene glycol monocrotyl ether, polypropylene glycol monocrotyl ether, polybutylene glycol monocrotyl ether, polyethylene glycol polypropylene glycol monocrotyl ether, polyethylene glycol polybutylene glycol monocrotyl ether, polypropylene glycol polybutylene glycol monocrotyl ether, polyethylene glycol polypropylene glycol polybutylene glycol monocrotyl ether, methoxypolyethylene glycol monocrotyl ether, methoxypolypropylene glycol monocrotyl ether, methoxybutylene glycol monocrotyl ether, methoxypolyethylene glycol polypropylene glycol monocrotyl ether, methoxypolyethylene glycol polybutylene glycol monocrotyl ether, methoxypolypropylene glycol polybutylene glycol monocrotyl ether, methoxypolyethylene glycol polypropylene glycol polybutylene glycol monocrotyl ether, ethoxypolyethylene glycol monocrotyl ether, ethoxypolypropylene glycol monocrotyl ether, ethoxypolypropylene glycol monocrotyl ether, ethoxypolybutylene glycol monocrotyl ether, ethoxypolybutylene glycol monocrotyl ether, ethoxypolyethylene glycol polypropylene glycol monocrotyl ether, ethoxypolyethylene glycol polybutylene glycol monocrotyl ether, ethoxypolypropylene glycol polybutylene glycol monocrotyl ether, ethoxypolypropylene glycol polybutylene glycol monocrotyl ether, and ethoxypolyethylene glycol polypropylene glycol polybutylene glycol monocrotyl ether. More than one of these monomers may be used.

Examples of the monomer (e) include an unsaturated monocarboxylic acid and monovalent metal salt, divalent metal salt, ammonium salt and an organic amine salt thereof, e.g. acrylic acid and methacylic acid; an unsaturated dicarboxylic acid and monovalent metal salt, divalent metal salt, ammonia salt, an organic amine salt and anhydride thereof, e.g., maleic acid, fumaric acid, citraconic acid and itaconic acid; or a monoester of these acids with an aliphatic alcohol having 1 to 20 carbon atoms or glycol having 2 to 4 carbon atoms or a polyalkylene glycol having 2 to 100 mols of these glycols. More than one of these monomers may be used.

Examples of the monomer (f) include an ester of an aliphatic alcohol having 1 to 20 carbon atoms with (meth) acrylic acid, and a diester of an unsaturated dicarboxylic acid such as maleic acid, fumaric acid and citraconic acid acids with an aliphatic alcohol having 1 to 20 carbon atoms or a glycol having 2 to 4 carbon atoms or a polyalkylene glycol having 1 to 100 mols of these glycols; an unsaturated amide such as (meth)acrylamide and (meth)acryl alkylamide, a vinyl ester such as vinyl acetate and vinyl propionate; an aromatic vinyl such as styrene; an unsaturated sulfonic acid such as vinyl sulfonic acid, (meth)allyl sulfonic acid, sulfoethyl (meth)acrylate, 2-(meth)acrylamide-2-methylpropane sulfonic acid and styrene sulfonic acid and monovalent metal salt, divalent metal salt, ammonium salt and an organic amine salt thereof. More than one of these monomers may be used.

The monomer (g) may be an unsaturated hydrocarbon having 2 to 12 carbon atoms, and examples of the monomer (g) include ethylene, propylene, 1-butene, 2-butene, isobutylene, n-pentene, isoprene, 2-methyl-1-butene, n-hexane, 2-methyl-1-pentene, 3-methyl-1-pentene, 4-methyl-1-pentene, 2-ethyl-1-butene, diisobutylene, 1,3-butadiene, 1,3-pentadiene, 1,3-hexadiene, 1,3-octadiene, 2-methyl-4-dimethyl-1-pentene, 2-methyl-4-dimethyl-2-pentene. Isobutylene also means spent BB containing isobutylene. Preferably α-olefin having 2 to 8 carbon atoms, especially α-olefin having 4 to 5 carbon atoms is used. More than one kind of these monomers may be used.

Examples of the monomer (h) include maleic anhydride, itaconic anhydride, citraconic anhydride and mesaconic anhydride. Maleic anhydride is the preferred monomer because of its reactivity, quality and lower cost. More than one such monomer may be used.

Examples of the monomer (i) include (meth)acrylic acid and monovalent metal salt, divalent metal salt, ammonium salt, and an organic amine salt thereof; an ester of an aliphatic alcohol having 1 to 20 carbon atoms with (meth) acrylic acid; an unsaturated dicarboxylic add such as maleic acid, fumaric acid and citraconic acid, and mono- or diester of these acids with an aliphatic alcohol having 1 to 20 carbon atoms or glycol having 2 to 4 carbon atoms or a polyalkylene glycol having 2 to 100 mols of these glycols; unsaturated amide such as (meth)acrylamide and (meth)acryl alkylamide; a vinyl ester such as vinyl acetate and vinyl propionate; an aromatic vinyl such as styrene; an unsaturated sulfonic acid such as vinyl sulfonic acid, (meth)allyl sulfonic add, sulfoethyl (meth)acrylate, 2-(meth)acrylamide-2-methylpropane sulfonic acid and styrene sulfonic acid and monovalent metal salt, divalent metal salt, ammonium salt, and an organic amine salt thereof. More than one such monomer may be used.

Examples of suitable defoaming agents include polyoxyalkylenes such as (poly)oxyethylene and (poly)oxypropylene, (poly)oxyalkylene alkyl ethers such as diethylene glycol heptyl ether, polyoxyethylene oleyl ether, polyoxypropylene butyl ether, polyoxyethylene polyoxypropylene-2-ethyl hexyl ether, and oxyethylene oxypropylene adducts of high alcohols of 12 to 14 carbons; polyoxyalkylene (alkyl)aryl ethers such as polyoxypropylene phenyl ether and polyoxyethylene nonylphenyl ether; acetylene ethers of alkylene oxide additionally polymerized with acetylene alcohols such as 2,4,7,9-tetramethyl-5-decyn-4,7-diol, 2,5-dimethyl-3-hexyn-2,5-diol, 3-methyl-1-butyn-3-ol; (poly)oxyalkylene aliphatic acid esters such as diethylene glycol oleic acid ester and ethylene glycol distearic acid ester; (poly)oxyalkylene sorbitan aliphatic acid esters such as polyoxyethylene sorbitan monolauric acid ester, and polyoxyethylene sorbitan trioleic acid ester; (poly)oxyalkylene alkyl (aryl)ether sulfuric acid esters such as polyoxypropylene methyl ester sodium sulfate and polyoxyethylene dodecyl phenol ether sodium sulfate; (poly)oxyalkylene alkyl phosphates such as (poly)oxyethylene stearyl phosphates; and (poly)oxyalkylene alkylamines such as polyoxyethylene laurylamine. More than one kind of these may be used.

The copolymer (A) is obtained by polymerization of a monomer mixture containing an unsaturated carboxylic acid base monomer as hereinabove described. As previously mentioned, this is preferably carried out in the presence of the defoaming agent. The proportion of the unsaturated carboxylic acid base monomer in the mixture is from 2 to 95% by weight; it is essential that this range be adhered to, otherwise the advantages of the present invention are not given. The proportion is preferably from 3–50% in the cases of (a), (b), (c) and (c), (d), (e), and from 30–90% in the case of (g), (h), (i).

To manufacture the copolymer (A), the abovementioned monomer mixture is copolymerized in, when required, the presence of the abovementioned defoaming agent using a polymerization initiator. The quantity of defoaming agent to be used is in the range of 0.01 to 10 weight percent of the monomer mixture, preferably 0.05 to 5 weight percent. When less than 0.01 weight percent of defoaming agent is used, adjustment of entrained air content of the cement mixture is difficult and a cement mixture of stable strength cannot be obtained. When the quantity of defoaming agent used exceeds 10 weight percent, the performance of the admixture obtained is reduced and a cement mixture of good fluidity cannot be obtained.

The copolymer (A) may be synthesised by known methods such as solution polymerization or bulk polymerization.

polymerization or bulk polymerization.

Solution polymerization may be done by a batch or a continuous process. Solvents which may be used include water, alcohols such as methyl alcohol, ethyl alcohol and isopropyl alcohol, aromatic or aliphatic hydrocarbons such as benzene, toluene, xylene, cyclohexane, and n-hexane and ketone compounds such as acetone and methyl ethyl ketone. For solubility of both the monomers and the resultant copolymer (A), it is desirable to use at least 1 solvent selected from the group consisting of water and lower alcohols of 1 to 4 carbon atoms. Methyl, ethyl and isopropyl alcohols are especially effective alcohols.

When the polymerization is carried out in an aqueous liquid, water-soluble polymerization initiators such as ammonium persulfate, sodium persulfate, hydrogen peroxide and azoamidine compounds such as azobis-2-methyl propionamide hydrochloric acid salt may be used. Accelerators such as sodium hydrogen sulfite may be used in combination with these initiators. Further, in polymerization with a lower alcohol, an aromatic hydrocarbon, an aliphatic hydrocarbon, an ester compound or a ketone compound as the solvent, peroxides such as benzoyl peroxide and lauroyl peroxide; hydroperoxides such as cumene hydroperoxide; and azo compounds such as 2,2'-azo-bis-isobutyronitrile may be used as polymerization initiators. In this case, it is possible to use accelerators such as amine compounds in combination. Further, in the event of using a water-lower alcohol solvent mixture, one of the various polymerization initiators or combinations of polymerization initiator and accelerator may be selected as suited and used. The polymerization temperature may be selected as required according to the solvent and polymerization initiator, but normally, the polymerization is carried out in the range of 0° to 120° C.

Bulk polymerization is carried out using peroxides such as benzoyl peroxide and lauroyl peroxide, hydroperoxides such as cumene hydroperoxide and aliphatic azo compounds such as 2,2'-azo-bis-isobutyronitrile as polymerization initiators and in a temperatures range of 50° to 200° C.

The copolymer (A) obtained in this manner can be used as prepared as the main ingredient of a fluidity-controlling admixture according to the invention. The copolymer (B) obtained by further neutralizing copolymer (A) with an alkaline substance as necessary may also be thus used, as may a crosslinked copolymer (C). Alkaline substances particularly suitable for neutralisation include hydroxides of monovalent metals and divalent metals, inorganic salts of sulfates and carbonates ammonia and organic amines.

Further, although the crosslinking agent may be selected from any suitable crosslinking agent capable of reactions with a functional group such as carboxyl group, hydroxyl group, amino group, sulfonic acid group, etc. contained in the copolymer (A), a crosslinking agent which has at least one divalent group designated by the following general formula (V)

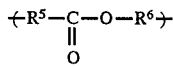

wherein $R^5$ and $R^6$ are independently selected from the group consisting of

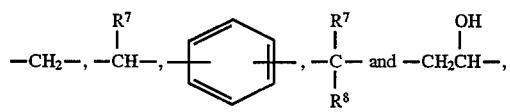

wherein, when $R^6$ is

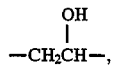

$R^5$ may be unnecessary, and $R^7$ and $R^8$ are independently alkyl group of 1 to 5 carbon atoms, as a structural unit and/or can be formed is preferable. Examples of these cross-linking agents include polyvalent glycidyl compounds such as ethylene glycol diglycidyl ether, polyethylene glycol diglycidyl ether, glycerol polyglycidyl ether, diglycerol diglycidyl ether, polyglycerol polyglycidyl ether, sorbitol polyglycidyl ether, pentaerythritol polyglycidyl ether, propylene glycol diglycidyl ether, polypropylene glycol diglycidyl ether, resorcin diglycidyl ether, 1,6-hexanediol diglycidyl ether, adipic acid diglycidyl ester, s-phtalic acid diglycidyl ester, etc.

It is desirable that the weight average molecular weight (hereinafter "$M_w$") of copolymer (A) (either as such or as the raw material of copolymer (C)) and copolymer (B) lie in the range of 500 to 500,000. When the monomer mixture comprises monomers (a), (b) and (c), $M_w$ lies preferably in the range of 5,000–500,000, when the mixture comprises monomers (d), (e) and (f) or monomers (g), (h) and (i), it lies preferably in the range 500–100,000. If $M_w$ is less than 500, the water-reducing capability and slump loss prevention capability of the cement dispersing agent are reduced. When $M_w$ exceeds 500,000, the water-reducing capability of the cement dispersing agent is reduced.

The copolymer (A) and/or the copolymer (B) and/or the crosslinked copolymer (C) may be used as a cement dispersing agent in an admixture according to the invention in the form of an aqueous solution or an aqueous emulsion and the air-entraining property in a cementitious mixture such as concrete may be adjusted arbitrarily by suitably adjusting the variety and/or dosage of the defoaming agent used. Further, with (A) and/or (B) and/or (C) as main ingredient, it is permissible to use the admixture according to the invention in combination with another known admixtures. Examples of such cement admixtures include conventional cement dispersing agents, air-entraining agents, cement wetting agents, expansion agents, waterproofing agents, retarding agents, quick-setting agents, water-soluble polymeric substances, thickeners, coagulants, drying shrinkage reducing agents, strength increasing agents and hardening accelerators.

The admixture of the invention may be used with hydraulic cements such as portland cement, high alumina cement and various blended cements or hydraulic materials other than cement, such as gypsum.

The admixture of this invention gives excellent performance even when relatively small quantities compared with conventional dispersing agents are used. For example, when used in mortars or concretes containing hydraulic cement, quantities used are typically from 0.01 to 1.0%, preferably from 0.02 to 0.5% by weight of cement. Various desirable effects such as increase in slump, reduction in unit water content, increase in strength and improvement in durability are brought about by such addition. With less than 0.01% addition, the performance is inadequate, whereas, when a large quantity in excess of 1.0% is used, the results are no better and costs more. It has the additional advantage of long shelf stability.

The invention therefore also provides a process of modifying the fluidity of a cementitious composition, comprising the incorporation into the composition of an admixture as hereinabove described. The use of an admixture as hereinabove described to modify the fluidity of a cementitious composition is also provided.

The invention is further described with reference to the following examples. In the examples, unless otherwise stated, "percent" and "part" shall indicate "weight percent" and "part by weight" respectively.

EXAMPLE 1

Preparation of Admixture No. 1

1695 parts of water is introduced in a glass reaction vessel equipped with a thermometer, a stirrer, a dropping funnel, a nitrogen introduction tube, and a reflux condenser, and the interior of the reaction vessel is purged with nitrogen while stirring and heating to 95° C. is carried out under a nitrogen atmosphere. An aqueous solution of monomer comprising 750 parts of methoxy polyethylene glycol monomethacrylate (average mol addition number of ethylene oxide, 10), 250 parts of methacrylic acid, 7 parts of "Pluronic" (trade mark) L-64 (polyoxyethylenepolyoxpropylene adduct manufactured by Asahi Denka Kogyo KK) as oxyalkylene base defoaming agent, and 1500 parts of water, and 672 parts of a 5% ammonium persulfate aqueous solution is then drip-fed for 4 hours, and after completion of dropping, 168 parts of 5% ammonium persulfate is further drip-fed for 1 hour. The temperature is then maintained at 95° C. for 1 hour to complete the polymerization reaction. An admixture of the present invention comprising an aqueous solution of a copolymer of Mw 35,000 is obtained.

EXAMPLES 2 to 5

Preparation of Admixtures Nos. 2 to 5

Admixtures (2) to (5) of the present invention comprising the copolymer (A) manufactured by operations similar to those in Example 1 are summarized in Tables 1 and 2.

EXAMPLE 6

Preparation of Admixture No. 6

349.6 parts of water, 1648 parts of polyethylene glycol monoallyl ether (average mol addition number of ethylene oxide, 5) and 23.2 parts of oxyethylene oxypropylene adduct to $C_{12}$–$C_{14}$ alcohols as oxyalkylene base defoaming agent in a glass reaction vessel equipped with a thermometer, a stirrer, a dropping funnel, a nitrogen introduction tube and a reflux condenser, and the interior of the reaction vessel is purged with nitrogen while stirring, and heating was carried out to 95° C. under a nitrogen atmosphere. A monomer/polymerization initiator mixture aqueous solution comprising 687 parts of maleic acid, 1030 parts of water and 57.2 parts of 5% ammonium persulfate aqueous solution is then drip-fed for 2 hours, and after completion of dropping, 527 parts of 5% ammonium persulfate aqueous solution is dropped for 1 hour. The temperature is then maintained at 95° C. to complete the polymerization reaction. The result is an admixture (6) of the present invention comprising an aqueous solution of a copolymer of average molecular weight of 6,000.

EXAMPLE 7

Preparation of Admixture No. 7

Admixture (7) of the present invention is obtained by drip-feeding 185 parts of 50% NaOH aqueous solution into the admixture (1) obtained in Example 1, this bringing it to pH 8.

EXAMPLES 8 to 21

Preparation of Admixtures Nos. 8 to 21

Admixtures (8) to (21) comprising the copolymer (B) of the present invention obtained in a similar method to Example 7 are summarized in Tables 3 and 4.

EXAMPLE 22

Preparation of Admixture No. 22

5000 parts of 20% admixture aqueous solution (solids content: 1000 parts) obtained in Example 1 is introduced into a glass reaction vessel equipped with a thermometer, a stirrer, a nitrogen introduction tube and a reflux condenser, and heating to 95° C. is carried out. 35 parts of o-phthalic acid diglycidyl ester is then added. The temperature is maintained at 95° C. for 3 hours to complete the crosslinking reaction and the result is admixture (22) comprising a crosslinking copolymer aqueous solution.

EXAMPLES 23 to 25

Preparation of Admixtures Nos. 23 to 25

Admixtures Nos. (23) to (25) of the present invention comprising the crosslinking copolymer (C) of the present invention manufactured by a similar method to Example 22 are summarized in Table 5.

EXAMPLE 26

Preparation of Admixture No. 26

420 Parts of 1-hexane, 490 parts of maleic anhydride, 9.1 parts of oxyethylene oxypropylene adduct of $C_{12}$–$C_{14}$ alcohols, 27 parts of azobisisobutylonitrile and 2730 parts of toluene are introduced in a glass reaction vessel equipped with a thermometer, a stirrer, a dropping funnel, a nitrogen introduction tube and a reflux condenser, and the interior is purged with nitrogen under stirring. After reacting at 80° C. for 7 hours under nitrogen atmosphere, and precipitated while polymer was collected and dried. 2500 Parts of 10% aqueous sodium hydroxide solution is added into 644 parts of the copolymer thus obtained and heated at 90° C. under stirring to obtain an admixture (26) of the present invention comprising a copolymer of average molecular weight of 6100.

EXAMPLES 27 and 28

Preparation of Admixtures Nos. 27 and 28

Admixtures (27) to (28) of the present invention comprising the copolymer (B) of the present invention manufactured by a similar method to Example 26 are summarized in Table 6.

TABLE 1

| Example | Admixture No. | solvent charged into the reaction vessel | monomer (b) monomer (e) | | monomer (a) monomer (d) | monomer (c) monomer (f) |
|---|---|---|---|---|---|---|
| 1 | (1) | water [1695.0] | MAA | [250.0] | MPEGMMA (n = 10) [750.0] | |
| 2 | (2) | water [1695.0] | AA | [200.0] | PEGMA (n = 25) [800.0] | |
| 3 | (3) | water [1315.0] | MAA | [250.0] | MPEGMMA (n = 25) [740.0] | methyl methacrylate |
| 4 | (4) | water [1695.0] | MAA | [300.0] | PEGMME (n = 25) [700.0] | |
| 5 | (5) | water [1800.0] | TEGMM | [369.6] | PEGMAE (n = 25) [630.4] | |
| 6 | (6) | water [349.6] | MA | [687.0] | PEGMAE (n = 25) [1648.0] | |

MAA: methacrylic acid
AA: acrylic acid
TEGMM: tetraethylene glycol monomaleate
MA: maleic acid
MPEGMMA: methoxy polyethylene glycol monomethacrylate
PEGMA: polyethylene glycol monoacrylate
PEGMME: polyethylene glycol monomethallyl ether
PEGMAE: polyethylene glycol monoallyl ether

TABLE 2

| Example | Reaction composition: numerals in brackets are parts by weight | | reaction | |
|---|---|---|---|---|
| | defoaming agent (II) | polymerization initiator | temperature (°C.) | molecular weight |
| 1 | Pluronic L-64 a) [7.0] | ammonium persulfate [20.0] | 95 | 35000 |
| 2 | polyethylene glycol polypropylene glycol nonyl phenyl ether [5.0] | azobis-2-methyl propiomidine hydrochloride [20.0] | 80 | 38000 |
| 3 | oxyethylene oxypropylene adduct of $C_{12}$–$C_{14}$ alcohols [1.0] | ammonium persulfate [40.0] | 95 | 23000 |
| 4 | Surfynol 440 b) [7.0] | ammonium persulfate [20.0] | 95 | 30000 |
| 5 | polyethylene glycol polypropylene glycol nonyl phenyl ether [5.0] | ammonium persulfate [15.0] | 95 | 10000 |
| 6 | oxyethylene oxypropylene adduct of $C_{12}$–$C_{14}$ alcohols [23.2] | ammonium persulfate [85.8] | 95 | 6000 | a) polyoxyethylene polyoxypropylene adduct (Asahi Denka K.K.)
b) acetylene alcohol polyoxyethylene adduct (Nisshin Kagaku Kogyo K.K.)
c) Monomer mixture is added in 40% aqueous solution and polymerization initiator is added in 5% aqueous solution.

TABLE 3

| Example | Admixture No. | solvent charged into the reaction vessel | monomer (b) monomer (e) | | monomer (a) monomer (d) | monomer (c) monomer (f) |
|---|---|---|---|---|---|---|
| 7 | (7) | water [1695.0] | MAA | [250.0] | MPEGMMA (n = 10) [750.0] | |
| 8 | (8) | water [2838.0] | MAA | [239.0] | MPEGMMA (n = 25) [1200.0] | |
| 9 | (9) | water [2838.0] | MAA | [239.0] | MPEGMMA (n = 25) [1200.0] | |
| 10 | (10) | water [2931.0] | MAA | [239.0] | MPEGMMA (n = 50) [1200.0] | |

TABLE 3-continued

| Example | Admixture No. | solvent charged into the reaction vessel | monomer (b) monomer (e) | monomer (a) monomer (d) | monomer (c) monomer (f) |
|---|---|---|---|---|---|
| 11 | (11) | water [3158.0] | MAA [239.0] | MPEGMMA (n = 50) [1200.0] | |
| 12 | (12) | water [3077.0] | MAA [177.0] | MPEGMMA (n = 50) [1262.0] | |
| 13 | (13) | water [2972.0] | MAA [239.0] | MPEGMMA (n = 75) [1200.0] | |
| 14 | (14) | water [3334.0] | SA [288.0] | MPEGMMA (n = 50) [1151.0] | |
| 15 | (15) | water [2195.0] | MAA [239.0] | PEGMMA (n = 5) [1200.0] | |
| 16 | (16) | water [2823.0] | MAA [239.0] | MPEGMMA (n = 50) [1080.0] | sodium sulfo-ethacrylate [120.0] |
| 17 | (17) | water [2924.0] | MAA [215.0] | MPEGMMA (n = 50) [1200.0] | methyl acrylate [24.0] |
| 18 | (18) | water [1695.0] | MAA [250.0] | MPEGMMA (n = 10) [750.0] | |
| 19 | (19) | water [1695.0] | MAA [300.0] | PEGMAE (n = 25) [700.0] | |
| 20 | (20) | water [1695.0] | MAA [300.0] | PEGMAE (n = 25) [700.0] | |
| 21 | (21) | water [349.6] | MA [687.0] | PEGMAE (n = 5) [1648.0] | |

MAA: methacrylic acid
SA: sodium acrylate
MA: maleic acid
MPEGMMA: methoxy polyethylene glycol monomethacrylate
PEGMMA: polyethylene glycol monomethacrylate
PEGMAE: polyethylene glycol monoallyl ether

TABLE 4

| Example | Reaction composition: numerals in brackets are parts by weight | | polymerization initiator | | reaction temperature (°C.) | alkaline substance | pH | molecular weight |
|---|---|---|---|---|---|---|---|---|
| | defoaming agent (II) | | | | | | | |
| 7 | Pluronic L-64 a) | [7.0] | APS | [20.0] | 95 | 50% NaOH | 8.0 | 36000 |
| 8 | Pluronic L-64 a) | [7.0] | APS | [38.0] | 95 | 50% NaOH | 8.0 | 40000 |
| 9 | Pluronic L-64 a) | [1.4] | APS | [38.0] | 95 | 50% NaOH | 8.0 | 39000 |
| 10 | oxyethylene oxypropylene adduct of $C_{12}$-$C_{14}$ alcohols | [14.0] | APS | [33.0] | 95 | 50% NaOH | 8.1 | 37000 |
| 11 | polyoxyethylene polyoxypropylene nonyl phenyl ether | [7.0] | APS | [22.0] | 95 | 50% NaOH | 8.5 | 113000 |
| 12 | surfynol 440 b) | [7.0] | APS | [26.1] | 95 | 50% NaOH | 7.7 | 53000 |
| 13 | polyoxyethylene polyoxypropylene oleate | [7.0] | APS | [31.3] | 95 | 50% NaOH | 7.6 | 34000 |
| 14 | polyoxyethylene polyoxypropylene sorbitan monolaurate | [21.0] | APS | [12.5] | 95 | 50% NaOH | 8.0 | 16000 |
| 15 | polyoxypropylene dodecyl benzene sulfonate | [21.0] | APS | [69.5] | 95 | 50% NaOH | 8.0 | 78000 |
| 16 | polyoxyethylene stearate | [21.0] | APS | [38.0] | 95 | 50% NaOH | 7.9 | 19000 |
| 17 | polyoxyethylene laurylamine | [21.0] | APS | [33.0] | 95 | 50% NaOH | 8.1 | 32000 |
| 18 | Pluronic L-64 a) | [7.0] | APS | [20.0] | 95 | 30% Ca(OH)$_2$ | 7.5 | 35000 |
| 19 | surfynol 440 b) | [7.0] | APS | [20.0] | 95 | 50% NaOH | 7.1 | 30000 |
| 20 | surfynol 440 b) | [7.0] | APS | [20.0] | 95 | TEA | 7.1 | 30000 |
| 21 | oxyethylene oxypropylene adduct of $C_{12}$-$C_{14}$ alcohols | [23.2] | APS | [85.8] | 95 | 50% NaOH | 7.8 | 6000 | a) polyoxyethylene polyoxypropylene adduct (Asahi Denka K.K.)
b) acetylene alcohol polyoxyethylene adduct (Nisshin Kagaku Kogyo K.K.)
c) Monomer mixture is added in 40% aqueous solution and polymerization initiator is added in 5% aqueous solution.
APS: ammonium persulfate
TEA: triethanolamine

TABLE 5

| Example No. | Admixture No. | Reaction composition: numerals in brackets are parts by weight copolymer (A) | Reaction composition: numerals in brackets are parts by weight crosslinking agent | Reaction temperature (°C.) | Molecular weight after cross-linking |
|---|---|---|---|---|---|
| 22 | (22) | Admixture No. (Mw: 35000) | o-phthalic asid diglycidyl ester | 95 | 220000 |
| 23 | (23) | Admixture No. (1) [Mw; 35000] | polyethylene glycol diglycidyl ether (n = 9) | 95 | 300000 |
| 24 | (24) | Admixture No. (4) [Mw; 38000] | 1,6-hexanediol diglycidyl ether | 95 | 200000 |
| 25 | (25) | Admixture No. (6) [Mw; 6000] | adipic acid diglycidyl ester | 95 | 150000 |

TABLE 6

| Example | Cement dispersing agent | Reaction composition: numerals in brackets are parts by weight | | | |
|---|---|---|---|---|---|
| | | Solvent charged into the reaction vessel | monomer (h) | monomer (g) | monomer (i) |
| 26 | (26) | toluene [2730] | maleic anhydride [490] | 1-hexene [420] | |
| 27 | (27) | methyl ethyl ketone [2571] | maleic anhydride [686] | isobutylene [364] | styrene [52] |
| 28 | (28) | toluene [2745] | maleic anhydride [147] | methoxy-polyethylene glycol allyl ether [768] | |

| Example | Reaction composition: numerals in brackets are parts by weight defoaming agent (II) | Reaction composition: numerals in brackets are parts by weight polymerization initiator | reaction temperature (°C.) | molecular weight |
|---|---|---|---|---|
| 26 | oxyethylene oxypropylene adduct of $C_{12}$–$C_{14}$ alcohols [9.1] | AIBN [27.0] | 80 | 5200 |
| 27 | polyoxyethylene laurylamine [5.5] | AIBN [10.0] | 80 | 6000 |
| 28 | polyoxyethylene polyoxypropylene adduct [6.4] | butyl peroxide [10.0] | 90 | 9000 |

Control 1

Preparation of Comparison Admixture No. 1

1695 Parts of water is introduced into a glass reaction vessel equipped with a thermometer, a stirrer, a dropping funnel, a nitrogen introduction tube, and a reflux condenser, and the interior of the reaction vessel is purged with nitrogen while stirring, and the mixture is heated to 95° C. under a nitrogen atmosphere. A monomer aqueous solution comprising 800 parts of methoxy polyethylene glycol monomethacrylate (average mol addition number of ethylene oxide, 10) 200 parts of methacrylic acid, and 1500 parts of water, and 672 parts of a 5% ammonium persulfate aqueous solution are respectively drip-fed for 4 hours, and after completion of feeding, 168 parts of 5% ammonium persulfate is added over a period of 1 hour. The temperature is maintained for 1 hour at 95° C. to complete a polymerization reaction. A comparison admixture (1) comprising an aqueous solution of a copolymer of average molecular weight of 35,000 is obtained.

Control 2

Preparation of Comparison Admixture No. 2

1695 parts of water is introduced into a glass reaction vessel equipped with a thermometer, a stirrer, a dropping funnel, a nitrogen introduction tube, and a reflux condenser, and the interior of the reaction vessel is purged with nitrogen while stirring, and the mixture is heated to 95° C. under a nitrogen atmosphere. A monomer aqueous solution comprising 800 parts of methoxy polyethylene glycol monomethacrylate (average mol addition number of ethylene oxide, 10), 200 parts of methacrylic acid, 0.005 parts of "Pluronic" L-64 (polyoxyethylene-polyoxypropylene adduct) as oxyalkylene base defoaming agent, and 1500 parts of water, and 672 parts of a 5% ammonium persulfate aqueous solution are respectively dip-fed for 4 hours, and after completion of feeding, 168 parts of 5% ammonium persulfate is added over a period at 1 hour. The temperature is maintained at 95° C. for 1 hour to complete a polymerization reaction. A comparison admixture (2) comprising an aqueous solution of a copolymer of $M_w$ 35,000 is obtained.

Control 3

Preparation of Comparison Admixture No. 3

To 100 parts of comparison admixture No. (1) obtained in Control 1, 0.1 part of polyoxyethylene polyoxypropylene nonyl phenyl ether as a polyoxyalkylene base defoaming agent is added to obtain a comparison cement dispersing agent (3).

Control 4

Preparation of Comparison Admixture No. 4

349.6 parts of water and 1648 parts of polyethylene glycol monoallyl ether (average mol addition number of ethylene oxide, 5) are introduced into a glass reaction vessel equipped with a thermometer, a stirrer, a dropping funnel, a nitrogen introduction tube and a reflux condenser, and the interior of the reaction vessel is purged with nitrogen while stirring, and the mixture is heated to 95° C. under a nitrogen atmosphere. A monomer/polymerization initiator mixture aqueous solution comprising 687 parts of maleic acid, 1030 parts of water and 57.2 parts of ammonium persulfate is dip-fed for 2 hours. After completion of feeding, 527 parts of 5% ammonium persulfate aqueous solution is added over a period of 1 hour. The temperature is maintained at 95° C. for 1 further hour to complete the polymerization reaction. A comparison admixture (4) comprising an aqueous solution of a copolymer of Mw 6,000 if obtained.

Control 5

Preparation of Comparison Admixture No. 5

A comparison admixture (5) is obtained by mixing 0.1 part of oxyethyleneoxypropylene adduct of $C_{12}$–$C_{14}$ alcohol as a polyalkylene base of defoaming agent to the comparison admixture No. (4) obtained in Control 4.

(Test of storage stability)

The 28 varieties of cement dispersing agent of the invention shown in Tables 1 to 6 are left standing at 50° C. and the storage stability is investigated by visually observing degrees of compatibility. Further, for purposes of comparison, tests are also made of the comparison cement dispersing agent (3) obtained in Control 3 and comparison cement dispersing agent (5) obtained in Control 5. The particle size of the defoaming agent is determined by using a laser diffraction type particle distribution meter (microtruck FRA). The results of these tests are given in Tables 7 and 8.

Further, evaluation of compatibilities are as follows:

◯: Uniformly compatible or stable dispersion
Δ: Not compatible or unstable dispersion
X: Separated into two layers

TABLE 7

| Example | Admixture used | Number of days elapsed | | | particl size (μm) |
|---|---|---|---|---|---|
| | | immediately | 50° C. after 1 day | 50° C., after 1 month | |
| 1 | (1) | ◯ | ◯ | ◯ | 1.3 |
| 2 | (2) | ◯ | ◯ | ◯ | 1.7 |
| 3 | (3) | ◯ | ◯ | ◯ | 1.3 |
| 4 | (4) | ◯ | ◯ | ◯ | 1.4 |
| 5 | (5) | ◯ | ◯ | ◯ | 7.1 |
| 6 | (6) | ◯ | ◯ | ◯ | 5.7 |
| 7 | (7) | ◯ | ◯ | ◯ | 1.8 |
| 8 | (8) | ◯ | ◯ | ◯ | 1.2 |
| 9 | (9) | ◯ | ◯ | ◯ | 1.2 |
| 10 | (10) | ◯ | ◯ | ◯ | 1.5 |
| 11 | (11) | ◯ | ◯ | ◯ | 1.3 |
| 12 | (12) | ◯ | ◯ | ◯ | 1.5 |
| 13 | (13) | ◯ | ◯ | ◯ | 1.2 |
| 14 | (14) | ◯ | ◯ | ◯ | 1.4 |
| 15 | (15) | ◯ | ◯ | ◯ | 1.4 |
| 16 | (16) | ◯ | ◯ | ◯ | 1.5 |
| 17 | (17) | ◯ | ◯ | ◯ | 1.2 |

TABLE 7-continued

| Example | Admixture used | immediately | 50° C. after 1 day | 50° C., after 1 month | particl size (μm) |
|---|---|---|---|---|---|
| 18 | (18) | ◯ | ◯ | ◯ | 1.3 |
| 19 | (19) | ◯ | ◯ | ◯ | 1.4 |
| 20 | (20) | ◯ | ◯ | ◯ | 1.4 |
| 21 | (21) | ◯ | ◯ | ◯ | 5.7 |
| 22 | (22) | ◯ | ◯ | ◯ | 1.3 |
| 23 | (23) | ◯ | ◯ | ◯ | 1.3 |
| 24 | (24) | ◯ | ◯ | ◯ | 1.4 |
| 25 | (25) | ◯ | ◯ | ◯ | 5.7 |
| 26 | (26) | ◯ | ◯ | ◯ | — |
| 27 | (27) | ◯ | ◯ | ◯ | — |
| 28 | (28) | ◯ | ◯ | ◯ | — |

"—" in particle size determination: particle size is not more than 0.1 μm or cannot be determined because of molten state

TABLE 8

| Control | Admixture used | Number of days elapsed | | | particl size (μm) |
|---|---|---|---|---|---|
| | | immediately | 50° C., after 1 day | 50° C., after 1 month | |
| 3 | comparative Admixture No. (3) | Δ | X | X | 2.2 |
| 5 | comparative Admixture No. (5) | Δ | X | X | 5.2 |

The cement used was ordinary portland cement (blend of equal amounts of 3 brands, specific gravity: 3.16), the fine aggregate was a blend of Oi River System pit sand and Kisarazu mountain sand (specific gravity 2.62, FM 2.71) and coarse aggregate was Ohme, Tokyo graywacke crushed stone (specific gravity 2.64, MS 20 mm).

The 28 varieties of the admixture according to the invention listed in Tables 1–6 and for comparison the comparison admixtures (1) to (5) and naphthalene sulfonate-formalin condensate (BNS) and melamine sulfonate-formalin condensate (MSF) are tested. As the comparative admixtures (1), (2) and (4) possess air-entraining properties, adjustments of entrained air contents using air-entraining agents are not made, while for the other admixtures of the invention (1)–(17) and the comparison admixtures (3) and (5) and for BNS and MSF, a commercial air-entraining agent ("Pozzolith" (trade mark) No. 303A manufactured by NMB Ltd.) is used in the dosages listed in Tables 9 and 10 to make adjustments of entrained air contents as suited.

The mix proportions for plain concrete without admixture according to the invention are unit cement content 320 kg/m³, unit water content 203 kg/m³ (water/cement ratio 0.634) and sand-aggregate ratio 49%, while the proportions for concrete using with the admixture are unit cement content 320 kg/m³, unit water content 166 kg/m³ (water-cement ratio 0.519), and sand-aggregate ratio 47%.

Concretes are manufactured under the conditions mentioned above, time-dependent changes in slump values and air content are measured and slump losses and air-entraining properties are evaluated. The time of setting and 28 day age compressive strength of concrete are also measured.

Measuring slump, air content, compressive strength and time of setting and the method of collecting compressive strength specimens are all adaptations of Japan Industrial Standards (JIS A 1101, 1108, 1128, 1132, 6204).

The results are given in Tables 9-14.

TABLE 9

| Example | Admixture used | Amount of cement dispersing agent a) | Amount of air entraining agent b) |
|---|---|---|---|
| 1 | (1) | 0.15 | 0.012 |
| 2 | (2) | 0.15 | 0.010 |
| 3 | (3) | 0.15 | 0.005 |
| 4 | (4) | 0.15 | 0.012 |
| 5 | (5) | 0.17 | 0.011 |
| 6 | (6) | 0.17 | 0.015 |
| 7 | (7) | 0.15 | 0.012 |
| 8 | (8) | 0.15 | 0.010 |
| 9 | (9) | 0.15 | 0.003 |
| 10 | (10) | 0.15 | 0.015 |
| 11 | (11) | 0.15 | 0.008 |
| 12 | (12) | 0.15 | 0.010 |
| 13 | (13) | 0.15 | 0.018 |
| 14 | (14) | 0.15 | 0.020 |
| 15 | (15) | 0.15 | 0.010 |
| 16 | (16) | 0.15 | 0.008 |
| 17 | (17) | 0.15 | 0.016 |
| 18 | (18) | 0.15 | 0.012 |
| 19 | (19) | 0.15 | 0.010 |
| 20 | (20) | 0.15 | 0.010 |
| 21 | (21) | 0.17 | 0.015 |
| 22 | (22) | 0.18 | 0.012 |
| 23 | (23) | 0.18 | 0.012 |
| 24 | (24) | 0.18 | 0.010 |
| 25 | (25) | 0.18 | 0.015 |
| 26 | (26) | 0.17 | 0.016 |
| 27 | (27) | 0.15 | 0.015 |
| 28 | (28) | 0.12 | 0.012 |

Remarks:
a) Percent by weight of solid content to cement
b) Percent by weight to cement

TABLE 10

| Control | Admixture used | Amount of cement dispersing agent a) | Amount of air entraining agent b) |
|---|---|---|---|
| A | plain concrete | — | — |
| B | BNS | 0.50 | 0.008 |
| C | MSF | 0.60 | 0.002 |
| 1 | comparative Admixture No. (1) | 0.15 | — |
| 2 | comparative Admixture No. (2) | 0.15 | — |
| 3 | comparative Admixture No. (3) | 0.15 | 0.011 |
| 4 | comparative Admixture No. (4) | 0.15 | — |
| 5 | comparative Admixture No. (5) | 0.15 | 0.013 |

Remarks:
a) Percent by weight of solid content to cement
b) Percent by weight to cement

TABLE 11

Slump (cm)/air content (vol %)

| Example | immediately after mixing | After 30 min. | After 60 min. | After 90 min. |
|---|---|---|---|---|
| 1 | 19.0/4.1 | 19.0/3.9 | 17.5/3.7 | 17.5/4.0 |
| 2 | 18.5/3.9 | 17.0/3.7 | 16.5/3.3 | 17.0/3.5 |
| 3 | 17.5/4.0 | 18.5/3.7 | 18.0/3.8 | 17.0/3.8 |
| 4 | 19.0/4.0 | 17.0/3.8 | 16.5/3.8 | 17.0/3.5 |
| 5 | 17.5/4.2 | 18.0/4.3 | 17.5/4.0 | 17.0/3.8 |
| 6 | 18.5/4.2 | 17.5/4.1 | 17.5/3.9 | 18.0/3.7 |
| 7 | 18.5/3.7 | 18.0/3.6 | 17.0/3.5 | 17.5/3.7 |
| 8 | 18.0/4.0 | 18.0/4.0 | 18.5/3.8 | 17.5/4.1 |
| 9 | 18.5/3.9 | 18.0/4.1 | 18.0/3.8 | 17.0/3.8 |
| 10 | 19.0/4.5 | 18.0/4.0 | 17.0/4.3 | 18.5/4.2 |
| 11 | 18.5/3.8 | 17.0/4.0 | 18.0/3.8 | 19.5/3.7 |
| 12 | 19.0/4.0 | 17.0/4.0 | 18.5/4.2 | 17.0/3.7 |
| 13 | 18.0/4.5 | 17.0/4.0 | 17.5/4.1 | 17.5/4.4 |
| 14 | 19.0/4.0 | 19.0/4.0 | 17.5/3.8 | 17.5/3.7 |
| 15 | 18.0/4.0 | 17.0/4.3 | 18.5/3.8 | 17.0/3.7 |
| 16 | 18.5/4.1 | 19.0/4.0 | 17.5/3.8 | 17.5/3.7 |
| 17 | 18.0/4.0 | 18.0/4.0 | 17.5/3.7 | 17.5/3.8 |
| 18 | 18.5/3.9 | 15.5/3.6 | 17.5/3.9 | 17.5/3.7 |

TABLE 12

Slump (cm)/air content (vol %)

| Example | immediately after mixing | After 30 min. | After 60 min. | After 90 min. |
|---|---|---|---|---|
| 19 | 18.5/3.9 | 18.0/4.0 | 18.0/4.0 | 17.5/3.8 |
| 20 | 18.0/4.1 | 17.0/3.8 | 17.0/3.9 | 17.5/3.6 |
| 21 | 19.0/3.8 | 17.0/3.4 | 17.0/3.7 | 17.0/3.5 |
| 22 | 17.0/3.4 | 20.5/3.7 | 19.5/3.6 | 19.0/3.5 |
| 23 | 17.0/3.6 | 20.0/3.5 | 19.5/3.6 | 18.0/3.6 |
| 24 | 17.0/3.9 | 20.0/3.9 | 19.0/4.0 | 18.5/3.7 |
| 25 | 17.0/4.0 | 21.0/4.1 | 19.0/3.7 | 17.5/3.9 |
| 26 | 19.5/4.1 | 19.0/3.7 | 18.0/3.0 | 17.5/3.3 |
| 27 | 18.0/4.3 | 18.0/4.1 | 17.0/4.2 | 17.0/3.9 |
| 28 | 18.5/3.7 | 18.0/3.8 | 18.5/3.5 | 17.5/3.5 |
| Control | | | | |
| A | 19.0/2.0 | 17.5/2.0 | 15.5/1.8 | 12.5/1.7 |
| B | 18.0/4.4 | 10.5/4.1 | 6.5/3.8 | 4.0/3.3 |
| C | 18.5/4.2 | 9.5/4.0 | 6.5/3.9 | 4.0/3.1 |
| 1 | 19.0/4.4 | 19.0/4.2 | 18.0/4.4 | 17.0/4.6 |
| 2 | 18.5/4.2 | 18.0/4.3 | 15.5/4.3 | 17.5/4.6 |
| 3 | 18.0/3.9 | 18.5/3.9 | 17.0/4.3 | 16.5/4.6 |
| 4 | 18.5/4.6 | 17.5/4.5 | 17.5/4.5 | 17.0/4.7 |
| 5 | 19.0/3.7 | 17.0/4.0 | 18.6/4.5 | 18.5/5.1 |

TABLE 13

| Example | Setting time (hr-min) Init. | Final | 28-Day Comp. Strength (kgf/cm²) |
|---|---|---|---|
| 1 | 6-20 | 8-30 | 480 |
| 2 | 6-20 | 8-10 | 472 |
| 3 | 6-30 | 8-30 | 467 |
| 4 | 6-20 | 8-40 | 461 |
| 5 | 6-30 | 8-20 | 458 |
| 6 | 6-10 | 8-40 | 462 |
| 7 | 6-10 | 8-40 | 477 |
| 8 | 6-20 | 8-30 | 470 |
| 9 | 6-00 | 8-40 | 488 |
| 10 | 6-30 | 8-40 | 494 |
| 11 | 5-50 | 8-10 | 453 |
| 12 | 6-00 | 8-50 | 475 |
| 13 | 6-20 | 9-00 | 455 |
| 14 | 6-30 | 8-50 | 459 |
| 15 | 6-40 | 9-10 | 486 |
| 16 | 6-00 | 8-30 | 477 |
| 17 | 6-10 | 8-20 | 463 |
| 18 | 6-20 | 9-00 | 473 |

TABLE 14

|  | Setting time (hr-min) | | 28-Day Comp. Strength (kgf/cm²) |
| --- | --- | --- | --- |
|  | Init. | Final |  |
| Example |  |  |  |
| 19 | 6-30 | 8-10 | 474 |
| 20 | 6-20 | 8-20 | 459 |
| 21 | 6-20 | 8-10 | 462 |
| 22 | 6-50 | 9-10 | 468 |
| 23 | 6-40 | 9-00 | 473 |
| 24 | 6-50 | 8-50 | 461 |
| 25 | 6-50 | 9-20 | 456 |
| 26 | 6-30 | 8-30 | 479 |
| 27 | 6-10 | 8-20 | 459 |
| 28 | 6-20 | 8-40 | 462 |
| Control |  |  |  |
| A | 5-40 | 7-50 | 329 |
| B | 5-30 | 7-30 | 407 |
| C | 5-30 | 7-40 | 410 |
| 1 | 6-20 | 8-20 | 422 |
| 2 | 6-20 | 8-40 | 431 |
| 3 | 6-30 | 8-30 | 419 |
| 4 | 6-00 | 8-30 | 417 |
| 5 | 6-10 | 8-20 | 425 |

From Tables 9 to 10, it may be seen that the shelf life of an admixture according to the invention is considerably improved over the case of the blend of defoaming agent with a copolymer.

Tables 9 to 14 show that the comparison admixtures (1) and (4) obtained by 5 polymerization without using a defoaming agent and the comparison admixture (2) obtained by using 0.005% of the defoaming agent produces an air content of 4.5–5%, so that dosage must be limited. Moreover, 28-day compressive strength is reduced. With admixtures according to the invention, air-entraining tendencies are reduced and adjustment can be made to any air content with an air-entraining agent. Further, other physical properties are equal to or better than comparison concretes, and it may particularly be noted that 28 day compressive strengths are greatly increased.

Moreover, comparison admixtures (3) and (5) with added defoaming agents added to comparison cement dispersing agent (1) show increases in entrained air content with elapse of time, whereas the air-entraining properties of admixtures according to the invention are stable with elapse of time and slump loss prevention is also superior compared with plain concrete, BNS and MSF.

The admixtures according to the invention ameliorate and even eliminate the problem of the excessive air-entraining properties of conventional polycarboxylic acid base high range air-entraining, water-reducing agents. They exhibit excellent shelf life and are capable of entraining suitable amounts of air. Thus, the use of an admixture according to the invention confers the possibility of preparing cementitious mixtures such as concrete of good fluidity with a high rate of water reduction, whichon hardening, will provide a hardened concrete object of high compressive strength.

We claim:

1. A fluidity-controlling admixture for cementitious compositions comprising an aqueous solution of a polymer, said polymer formed by polymerizing a monomer mixture in the presence of at least one oxyalkylene-based defoaming agent, said monomer mixture comprising (a) 5–98% by weight of an (alkoxy)polyalkylene glycol mono(meth)acrylic acid ester monomer of formula (I)

$$R^1-CH=C(R^2)-COO(R^3O)_m-R^4 \quad (I)$$

wherein $R^1$ and $R^2$ are independently hydrogen or methyl,
$R^3$ is an alkylene group of from 2–4 carbon atoms,
$R^4$ is hydrogen or an alkyl group of from 1 to 22 carbon atoms, and
m represents an integer of 1 to 100, (b) 2 to 95% by weight of a (meth)acrylic acid based monomer of formula (II)

$$R^1-CH=C(R^2)-COOM^1 \quad (II)$$

wherein $R^1$ and $R^2$ have the meanings given above, and $M^1$ is hydrogen, a monovalent metal, a divalent metal, an ammonium group or an organic amine group, and (c) 0 to 50% by weight of a monomer capable of being copolymerized with monomers (a) and (b), provided that the sum of (a), (b) and (c) shall be 100% by weight, said oxyalkylene-based defoaming agent selected from the group consisting of (poly)oxyalkylenes, (poly)oxyalkylene alkyl ethers, oxyethylene and oxypropylene adducts of high alcohols of 12 to 14 carbon atoms, polyoxyalkylene(alkyl)aryl ethers, acetylene ethers of alkylene oxide additionally polymerized with acetylene alcohols, (poly)oxyalkylene aliphatic acid esters, (poly)oxyalkylene (alkyl)aryl ether sulfuric acid esters, (poly)oxyalkylene alkyl phosphates, (poly)oxyalkylene sorbitan aliphatic acid esters and (poly)oxyalkylene alkylamines, said defoaming agent being either dissolved in the polymer solution or stably dispersed therein in particles of no more than 20 μM diameter.

2. A fluidity-controlling admixture for cementitious compositions comprising an aqueous solution of a polymer, said polymer formed by polymerizing a monomer mixture in the presence of at least one oxyalkylene-based defoaming agent, said monomer mixture comprising (a) 5–98% by weight of an (alkoxy)polyalkylene glycol mono(meth)allyl ether based monomer of formula (III)

$$R^1-CH=C(R^2)-(CH_2)_n-O-(R^3O)_m-R^4 \quad (III)$$

wherein $R^1$ and $R^2$ are independently hydrogen or methyl,
$R^3$ is an alkylene group of from 2–4 carbon atoms,
$R^4$ is hydrogen or an alkyl group of from 1 to 22 carbon atoms,
m represents an integer of 1 to 100, and
n is 0 or 1;

(b) 2 to 95% by weight of an ethylenically Unsaturated carboxylic acid based monomer of formula (IV)

$$X-C(Y)=C(Z)-COOM^2 \quad (IV)$$

wherein

X and Y are independently selected from hydrogen, methyl and —COOM³ or X and Y together with —COOM² form an anhydride ring, Z is selected from —CH₂COOM³, hydrogen or methyl, and M² and M³ are independently selected from hydrogen, monovalent metal, divalent metal, an ammonium group, an organic amine group, an alkyl group of 1–20 carbon atoms, an alkylene glycol of 2–4 carbon atoms and a polyalkylene glycol of from 2–100 moles of glycol adduct, provided that a least one of M² and M³ is selected from hydrogen, monovalent metal, divalent metal, ammonium group and an organic amine group, and (c) 0 to 50% by weight of a monomer capable of being copolymerized with monomers (a) and (b), provided that the sum of (a), (b) and (c) shall be 100% by weight, said oxyalkylene-based defoaming agent selected from the group consisting of (poly)oxyalkylenes, (poly)oxyalkylene alkyl ethers, oxyethylene and oxypropylene adducts of high alcohols of 12 to 14 carbon atoms, polyoxyalkylene(alkyl)aryl ethers, acetylene ethers of alkylene oxide additionally polymerized with acetylene alcohols, (poly)oxyalkylene aliphatic acid esters, (poly)oxyalkylene (alkyl)aryl ether sulfuric acid esters, (poly)oxyalkylene alkyl phosphates, (poly)oxyalkylene sorbitan aliphatic acid esters and (poly)oxyalkylene alkylamines, said defoaming agent being either dissolved in the polymer solution or stably dispersed therein in particles of no more than 20 μM diameter.

3. A fluidity-controlling admixture according to claim 1 wherein said oxyalkylene-based defoaming agent is present in an amount of 0.01 to 10 weight percent of the monomer mixture.

4. A fluidity-controlling admixture according to claim 2 wherein said oxyalkylene-based defoaming agent is present in an amount of 0.01 to 10 weight percent of the monomer mixture.

5. A process for modifying the fluidity of a cementitious composition comprising incorporating into a cementitious composition an admixture according to claim 1.

6. A process for modifying the fluidity of a cementitious composition comprising incorporating into a cementitious composition an admixture according to claim 2.

7. A cementitious composition comprising cement, aggregate and a fluidity-controlling admixture according to claim 1 said fluidity-controlling admixture being present in an amount sufficient to modify the fluidity of the cementitious mix.

8. A cementitious composition comprising cement, aggregate and a fluidity-controlling admixture according to claim 2, said fluidity-controlling admixture being present in an amount sufficient to modify the fluidity of the cementitious mix.

9. A process for producing a fluidity-controlling admixture for cementitious compositions which comprises polymerizing a monomer mixture in the presence of at least one oxyalkylene-based defoaming agent, said monomer mixture comprising (a) 5–98% by weight of an (alkoxy)polyalkylene glycol mono(meth)acrylic acid ester monomer of formula (I)

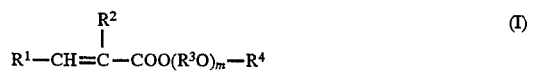

wherein
R¹ and R² are independently hydrogen or methyl,
R³ is an alkylene group of from 2–4 carbon atoms,
R⁴ is hydrogen or an alkyl group of from 1 to 22 carbon atoms, and
m represents an integer of 1 to 100, (b) 2 to 95% by weight of a (meth)acrylic acid based monomer of formula (II)

wherein
R¹ and R² have the meanings given above, and M¹ is hydrogen, a monovalent metal, a divalent metal, an ammonium group or an organic amine group, and (c) 0 to 50% by weight of a monomer capable of being copolymerized with monomers (a) and (b), provided that the sum of (a), (b) and (c) shall be 100% by weight, said defoaming agent selected from the group consisting of (poly)oxyalkylenes, (poly)oxyalkylene alkyl ethers, oxyethylene and oxypropylene adducts of high alcohols of 12 to 14 carbon atoms, polyoxyalkylene (alkyl)aryl ethers, acetylene ethers of alkylene oxide additionally polymerized with acetylene alcohols, (poly)oxyalkylene aliphatic acid esters, (poly)oxyalkylene (alkyl)aryl ether sulfuric acid esters, (poly)oxyalkylene alkyl phosphates, (poly)oxyalkylene sorbitan aliphatic acid esters and (poly)oxyalkylene alkylamines.

10. A process for producing a fluidity-controlling admixture for cementitious compositions comprising polymerizing a monomer mixture in the presence of at least one oxyalkylene-based defoaming agent, said monomer mixture comprising (a) 5–98% by weight of an (alkoxy)polyalkylene glycol mono(meth)allyl ether based monomer of formula (III)

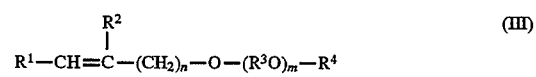

wherein
R¹ and R² are independently hydrogen or methyl,
R³ is an alkylene group of from 2–4 carbon atoms,
R⁴ is hydrogen or an alkyl group of from 1 to 22 carbon atoms,
m represents an integer of 1 to 100, and
n is 0 or 1;

(b) 2 to 95% by weight of an ethylenically unsaturated carboxylic acid based monomer of formula (IV)

wherein
X and Y are independently selected from hydrogen, methyl and —COOM³ or X and Y together with —COOM² form an anhydride ring,
Z is selected from —CH₂COOM³, hydrogen or methyl, and
M² and M³ are independently selected from hydrogen, monovalent metal, divalent metal, an ammonium group, an organic amine group, an alkyl group of 1–20 carbon atoms, an alkylene glycol of 2–4 carbon atoms and a polyalkylene glycol of from 2–100 moles of glycol adduct, provided that a least one of M² and M³ is selected from hydrogen, monovalent metal, divalent metal, ammonium group and an organic amine group, and (c) 0 to 50% by weight of a monomer capable of being copolymerized with monomers (a) and (b), provided that the sum of (a), (b) and (c) shall be 100% by weight, said defoaming agent selected from the group consisting of (poly)oxyalkylenes, (poly)oxyalkylene alkyl ethers, oxyethylene and oxypropylene adducts of high alcohols of 12 to 14 carbon atoms, polyoxyalkylene (alkyl)aryl ethers, acetylene ethers of alkylene oxide additionally polymerized with acetylene alcohols, (poly)oxyalkylene aliphatic acid esters, (poly) oxyalkylene (alkyl)aryl ether sulfuric acid esters, (poly) oxyalkylene alkyl phosphates, (poly)oxyalkylene sorbitan aliphatic acid esters and (poly)oxyalkylene alkylamines.

11. A process according to claim 9 wherein said oxyalkylene-based defoaming agent is present in an amount of 0.01 to 10 weight percent of the monomer mixture.

12. A process according to claim 10 wherein said oxyalkylene-based defoaming agent is present in an amount of 0.01 to 10 weight percent of the monomer mixture.

13. A fluidity-controlling admixture for cementitious compositions comprising an aqueous solution of a polymer, said polymer formed by polymerizing a monomer mixture in the presence of at least one oxyalkylene-based defoaming agent, said monomer mixture comprising (a) 5–98% by weight of an α-olefinic monomer having 2–12 carbon atoms, (b) 2 to 95% by weight of an ethylenically unsaturated dicarboxylic acid anhydride based monomer, and (c) 0 to 50% by weight of a monomer capable of being copolymerized with monomers (a) and (b), provided that the sum of (a), (b) and (c) shall be 100% by weight, said oxyalkylene-based defoaming agent selected from the group consisting of (poly)oxyalkylenes, (poly) oxyalkylene alkyl ethers, oxyethylene and oxypropylene adducts of high alcohols of 12 to 14 carbon atoms, polyoxyalkylene(alkyl)aryl ethers, acetylene ethers of alkylene oxide additionally polymerized with acetylene alcohols, (poly)oxyalkylene aliphatic acid esters, (poly) oxyalkylene (alkyl)aryl ether sulfuric acid esters, (poly) oxyalkylene alkyl phosphates, (poly)oxyalkylene sorbitan aliphatic acid esters and (poly)oxyalkylene alkylamines, said defoaming agent being either dissolved in the polymer solution or stably dispersed therein in particles of no more than 20 µM diameter.

14. A fluidity-control admixture according to claim 13 wherein said oxyalkylene-based defoaming agent is present in an amount of 0.01 to 10 weight percent of the monomer mixture.

15. A process for producing a fluidity-controlling admixture for cementitious compositions comprising polymerizing a monomer mixture in the presence of at least one oxyalkylene-based defoaming agent, said monomer mixture comprising (a) 5–98% by weight of an α-olefinic monomer having 2–12 carbon atoms, (b) 2 to 95% by weight of an ethylenically unsaturated dicarboxylic acid anhydride based monomer, and (c) 0 to 50% by weight of a monomer capable of being copolymerized with monomers (a) and (b), provided that the sum of (a), (b) and (c) shall be 100% by weight, said defoaming agent selected from the group consisting of (poly)oxyalkylenes, (poly)oxyalkylene alkyl ethers, oxyethylene and oxypropylene adducts of high alcohols of 12 to 14 carbon atoms, polyoxyalkylene(alkyl)aryl ethers, acetylene ethers of alkylene oxide additionally polymerized with acetylene alcohols, (poly)oxyalkylene aliphatic acid esters, (poly)oxyalkylene (alkyl)aryl ether sulfuric acid esters, (poly)oxyalkylene alkyl phosphates, (poly)oxyalkylene sorbitan aliphatic acid esters and (poly)oxyalkylene alkylamines.

16. A process for producing a fluidity-controlling admixture according to claim 15 wherein said oxyalkylene-based defoaming agent is present in an amount of 0.01 to 10 weight percent of the monomer mixture.

17. A process for producing a fluidity-controlling admixture for cementitious compositions comprising polymerizing a monomer mixture in the presence of an oxyalkylene-based defoaming agent, said monomer mixture comprising at least one unsaturated carboxylic acid based monomer.

* * * * *